(12) United States Patent
Kong

(10) Patent No.: US 8,244,174 B1
(45) Date of Patent: Aug. 14, 2012

(54) SYSTEM FOR MOBILE STATION POSITIONING

(75) Inventor: Seung Hyun Kong, Sunnyvale, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 1374 days.

(21) Appl. No.: 11/599,699

(22) Filed: Nov. 15, 2006

(51) Int. Cl.
*H04B 7/14* (2006.01)
(52) U.S. Cl. ............ 455/25; 455/422.1; 455/456.1
(58) Field of Classification Search .... 455/456.1–456.6, 455/25, 422.1
See application file for complete search history.

(56) References Cited

U.S. PATENT DOCUMENTS

| | | | | |
|---|---|---|---|---|
| 5,548,613 | A * | 8/1996 | Kaku et al. ............ | 375/150 |
| 6,157,820 | A * | 12/2000 | Sourour et al. ......... | 455/226.2 |
| 6,963,750 | B1 * | 11/2005 | Cheng et al. ........... | 455/458 |
| 7,630,738 | B2 * | 12/2009 | Hirano et al. .......... | 455/562.1 |
| 2006/0025155 | A1 * | 2/2006 | Benes et al. ........... | 455/456.1 |

OTHER PUBLICATIONS

Juan Reig, Oscar López-Jiménez, Lorenzo Rubio and Narcis Cardona ,"Random Access Channel (RACH) Parameters",Sep. 26, 2004, IEEE.*

* cited by examiner

*Primary Examiner* — Vladimir Magloire
(74) *Attorney, Agent, or Firm* — Crawford Maunu PLLC

(57) ABSTRACT

Mobile station positioning is implemented using various methods and devices. According to one example embodiment of the present invention, an azimuth angle estimation of the location of a mobile station is accomplished using a radio-signal processing apparatus. The azimuth angle is estimated with respect to a nearby base station that covers a service area using common sectorization via multiple directional antennas respectively transmitting at different azimuth angles. The apparatus has a memory for storing information that associates directional sector antennas of the nearby base station and expected antenna radiation gains in the common sectorization service area corresponding to locations relative to the nearby base station. The apparatus also includes a processor arrangement that determines received signal strengths of respective signals received from different ones of the directional sector antennas of the nearby base station and that determines estimated azimuth angles by comparing the stored information with the received signal strengths.

15 Claims, 4 Drawing Sheets

SYSTEM FOR MOBILE STATION POSITIONING

FIELD OF THE INVENTION

The present invention relates generally to systems and approaches for determining position information for mobile stations, and more particularly to using angle of departure estimation to determine position information.

BACKGROUND

Mobile positioning technologies that utilize measurements of wireless communication signals are emerging as viable options in mobile communication systems today. Some mobile positioning systems have been developed for location based services (LBS) in code division multiple access (CDMA) based mobile communication systems but they still have problems related to mobile communication channels and systems. In CDMA or wideband code division multiple access (WCDMA) based mobile communication systems, hearability is one of the most critical and practical challenges to using its wireless communication signals for positioning.

The academy and industry have continually engaged in efforts to develop reliable positioning technologies for mobile phone users. The emergency 911 (E911) requirement, for emergency rescue service, enforced by the United States (US) Federal Communications Commission (FCC) dramatically increased the interest in mobile positioning technologies. In 1999, the FCC tightened the Phase II location accuracy requirement. This requirement demanded handset-based solutions provide a location accuracy of 50 meters in 67 percent of calls and 150 meters in 95 percent of calls. The requirement further required that network-based solutions provide a location accuracy of 100 meters in 67 percent of calls and 300 meters in 95 percent of calls for handset-based solutions. Handset-based solutions are for non-legacy phones and network-based solutions are for legacy (communications-only) phones. The executive body of the European Union (EU) is working on similar initiatives for their wireless emergency calls, E112. Mobile communication service providers are also required to support their customers with location based services (LBS).

Some positioning technologies have been accepted and deployed in second generation mobile communication systems such as the Global System for Mobile Communication (GSM) standardized by European Telecommunication Standard Institute (ETSI) and the Interim Standard 95 (IS-95) standardized by Telecommunication Industry Association (TIA) of United States. GSM uses Time Division Multiple Access (TDMA) technology where mobile terminals (known as mobile stations in IS-95—'mobile station' will be used instead of 'mobile terminal' hereafter) are allocated their own time slots and frequency channel assignments. IS-95 is based on Code Division Multiple Access (CDMA) technology where mobile stations simultaneously share time and frequency resources.

Unlike IS-95 mobile stations, GSM mobile stations have a better chance of receiving signals transmitted from neighboring base stations without having large interference from the service base station. Enhanced Observed Time Difference (E-OTD) positioning system, in GSM, utilizes Time Difference of Arrival (TDOA) measurements of received wireless signals that are transmitted from GSM base stations. E-OTD shows that positioning systems utilizing wireless communication signal measurements can provide sufficient positioning accuracy and reliability. Universal Mobile Telecommunication Systems (UMTS), the third generation mobile communication system standardized by third Generation Partnership Project (3GPP), utilizes Wideband CDMA (WCDMA) technology for its Common Air Interface (CAI). Therefore, IS-95 mobile stations and UMTS user equipments (UEs), same system elements as mobile stations in IS-95, experience difficulties in measuring TDOA of received wireless signals transmitted from neighboring base stations due to the interference from the service base station.

In general, the service base station is the closest base station to the mobile station so that the received signal strength (RSS) of the signal from the service base station is much larger than the RSS of signals from all other neighboring base stations. This is because IS-95 and UMTS are CDMA based mobile communication systems in which a mobile station receives signals transmitted from all of the surrounding base stations continuously. The presence of strong interference from the service base station is one of the most difficult problems to overcome for mobile positioning systems trying to obtain multiple measurements for received wireless signals transmitted from multiple base stations in IS-95 and UMTS. This problem is sometimes referred to as the hearability problem.

These and other issues have presented challenges to the implementation of the mobile station position, including those involving cellular communications and those used in similar applications.

SUMMARY

The claimed invention is directed to cellular positioning systems and methods. The present invention is exemplified in a number of implementations and applications, some of which are summarized below.

According to one example embodiment of the present invention, estimated azimuth angle relative to the location of a mobile station is accomplished using a radio-signal processing apparatus. The azimuth angle is estimated with respect to a nearby base station that covers a service area using common sectorization via multiple directional antennas respectively transmitting at different azimuth angles. The apparatus has a memory for storing information that associates directional sector antennas of the nearby base station and expected antenna radiation gains in the common sectorization service area corresponding to locations relative to the nearby base station. The apparatus also includes a processor arrangement that determines received signal strengths of respective signals received from different ones of the directional sector antennas of the nearby base station and that determines the estimated azimuth angle by comparing the stored information with the received signal strengths.

According to another example embodiment of the present invention, a method is implemented for determining an estimated azimuth angle for the location of a mobile station. The azimuth angle estimation is with respect to a nearby base station covering a service area using common sectorization via multiple directional antennas respectively transmitting at different azimuth angles. The method includes receiving signals from the multiple directional antennas and determining received signal strengths for the multiple directional antennas. The received signal strengths are compared to information that associates directional sector antennas of the nearby base station and expected antenna radiation gains in the common sectorization service area corresponding to locations relative to the nearby base station. The estimated azimuth angle is then provided based upon a result of the comparing step.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings, in which.

Figure 1:
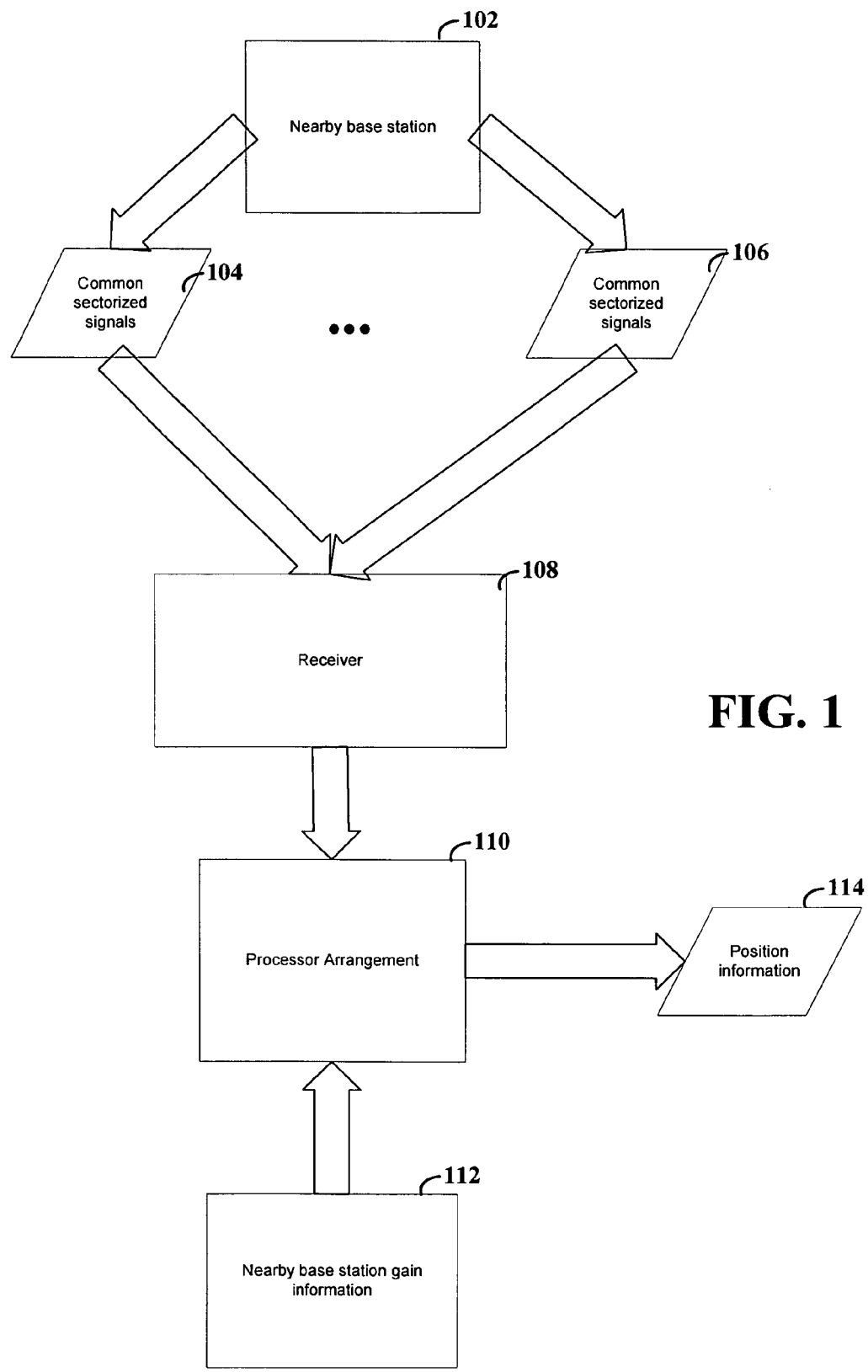
FIG. 1 shows a block diagram of a system for mobile station positioning, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be useful for a variety of mobile positioning apparatus and methods, and the invention has been found to be particularly suited for use in arrangements and methods dealing with azimuth angle calculations. While the present invention is not necessarily limited to such applications, various aspects of the invention may be appreciated through a discussion of various examples using this context.

Consistent with one example embodiment of the present invention, estimation of an azimuth angle relative to the location of a mobile station is accomplished using a radio-signal processing apparatus. The azimuth angle is estimated with respect to a nearby base station that covers a service area using common sectorization via multiple directional antennas respectively transmitting at different azimuth angles. The apparatus has a memory for storing information that associates directional sector antennas of the nearby base station and expected antenna radiation gains in the common sectorization service area corresponding to locations relative to the nearby base station. The apparatus also includes a processor arrangement that determines a received signal strength of signals received from the directional sector antennas of the nearby base station and that determines the estimated azimuth angle by comparing the stored information with the received signal strength.

Consistent with another example embodiment of the present invention, an Angle of Departure (AOD) estimation technique provides positioning information when the mobile station has a hearability problem (e.g., for a mobile station in an inner cell area). For inner cell areas intersector pilot channels can often be easier to detect than the pilot channels from neighboring base stations. Since the time of arrival (TOA) measurements such as real time difference (RTD) in IS-95 or round trip time (RTT) in UMTS is only obtainable to associated base stations, the service base station can obtain TOA measurement of any mobile station within the cell area. Therefore, the AOD and TOA measurements often are easier measurements to obtain than measurements related to the neighboring base station when a mobile station is located within an inner cell area. Moreover, the lines of AOD and the TOA circle are perpendicular to each other, ensuring that the combination of the two measurements can be used to provide a good position estimate.

Turning now to the figures, FIG. 1 shows a block diagram of a system for mobile station positioning, according to an example embodiment of the present invention. Nearby base station 102 transmits common sectorized signals 104 through 106. Receiver 108 is part of a mobile station for which the positioning information is to be determined. Processor arrangement 110 receives information relative to the received signals and also information about the gain of the signals from the nearby base station relative to azimuth angles and/or distance from the nearby base station to produce position information 114.

Common sectorized signals 104 through 106 originate from a plurality of directional antennas that are directed such that they produce signals 104 through 106 by transmissions directed at different azimuth angles from each other. Moreover, the signals are considered common sectorized signals due to the sharing of a common frequency (spectrum) and time for their transmissions. Accordingly, the signals from a common sectorized base station potentially overlap in the frequency and time domains. CDMA transmission and similar techniques, such as those used by the IS-95 and other specifications, are examples of techniques that employ common sectorized transmissions.

Processor arrangement 110 compares the received signal strength (RSS) of signals 104 through 106 to the stored information from memory 112 (e.g., nearby base station gain information). This comparison can then be used to determine the angle and distance from the nearby base station. The position information is derived without necessitating signals from other base stations. This can be particularly useful for situations where the receiver 108 is in close proximity to the base station.

In one instance, the RSS compared by processor arrangement 110 is based upon the signal strength of pilot signals. In many communication protocols pilot signals are used by the receiver to synchronize with the transmitter (e.g., with respect to time and/or frequency). Often the receiver performs synchronization by searching for the pilot signals by looking for a known pattern or symbol carried by the pilot signal (e.g., a series of consecutive 0s or 1s). In one instance, this known symbol can be used to determine the RSS of the signal. Often, the actual symbols carried by a signal affect the RSS. Thus, it can sometimes be advantageous to know the symbol carried because the gain can be determined independent of any decoding of the actual symbol carried. For instance, the RSS/gain calculation may rely upon the same symbol for each calculation, rather than necessitating an adjustment for different symbols.

For many transmission systems, the transmitted signal is received from multiple paths. For instance, a line-of-sight (LOS) angle is the most direct path and often has the strongest signal strength. Other paths result from the signal transmitted at other angles being reflected by environmental factors. These reflected signals often exhibit significant degradation of their RSS and can also be the result of a transmission originating from azimuth angles that are not consistent with the receiver's location. According to one example embodiment of the present invention, the RSS is calculated using the earliest arrival component of the signal. This is particularly useful for implementing a system that limits the RSS calculation to the LOS angle.

Processor 110 can be implemented using various different configurations. In one such implementation, a single general processor can be configured using a software application. In another instance, specifically designed processors, circuits and other logic can be used to perform various portions of the calculation, determination and similar processing functions. For instance, it can sometimes be advantageous to offload functions that require extensive computational power to other logic and processors.

Receiver 108 can be implemented using various antenna and receiver circuits currently used for cellular and similar transmission systems (e.g., cell phones, PDAs and the like). The design and functionality of such receiver circuits is known and has been omitted for the sake of brevity.

Figure 2:
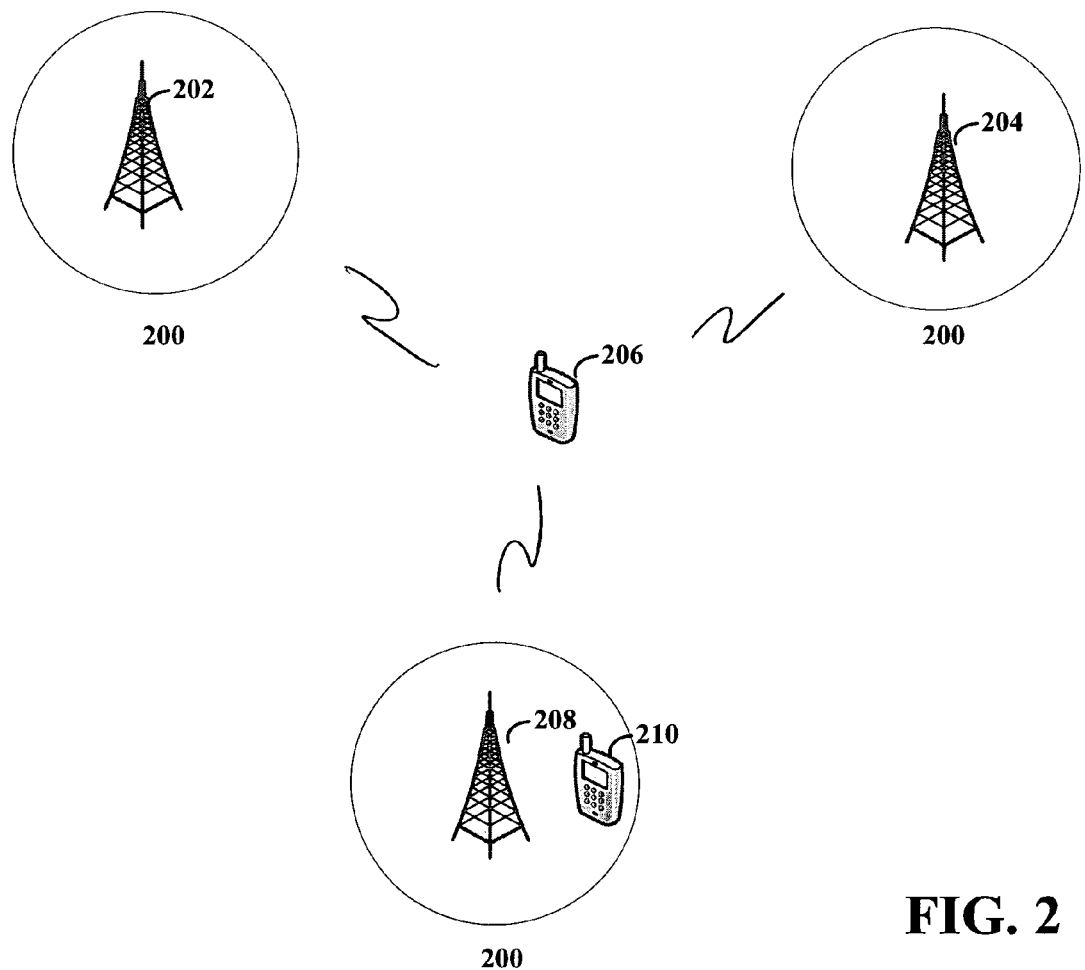
FIG. 2 shows mobile stations locations relative to several base stations, according to an example embodiment of the present invention.

FIG. 2 shows mobile stations locations relative to several base stations, according to an example embodiment of the present invention. Base stations 202, 204 and 208 each transmit and receive signals through common sectorized techniques. These signals are used by mobile stations 206 and 210. Area 200 represents a distance from each transmitter in which mobile stations are subject to the hearability problem. Thus, because mobile station 206 is not subject to the hearability problem, standard positioning techniques (e.g., TOA) can be used to determine the location of 206. Mobile station 210, however, is located within area 200, and thus, may be subject to interference from the nearby base station 208. Thus, it can be advantageous to determine the position information for mobile station 210 independent base stations 202 and 204.

Figure 2A:
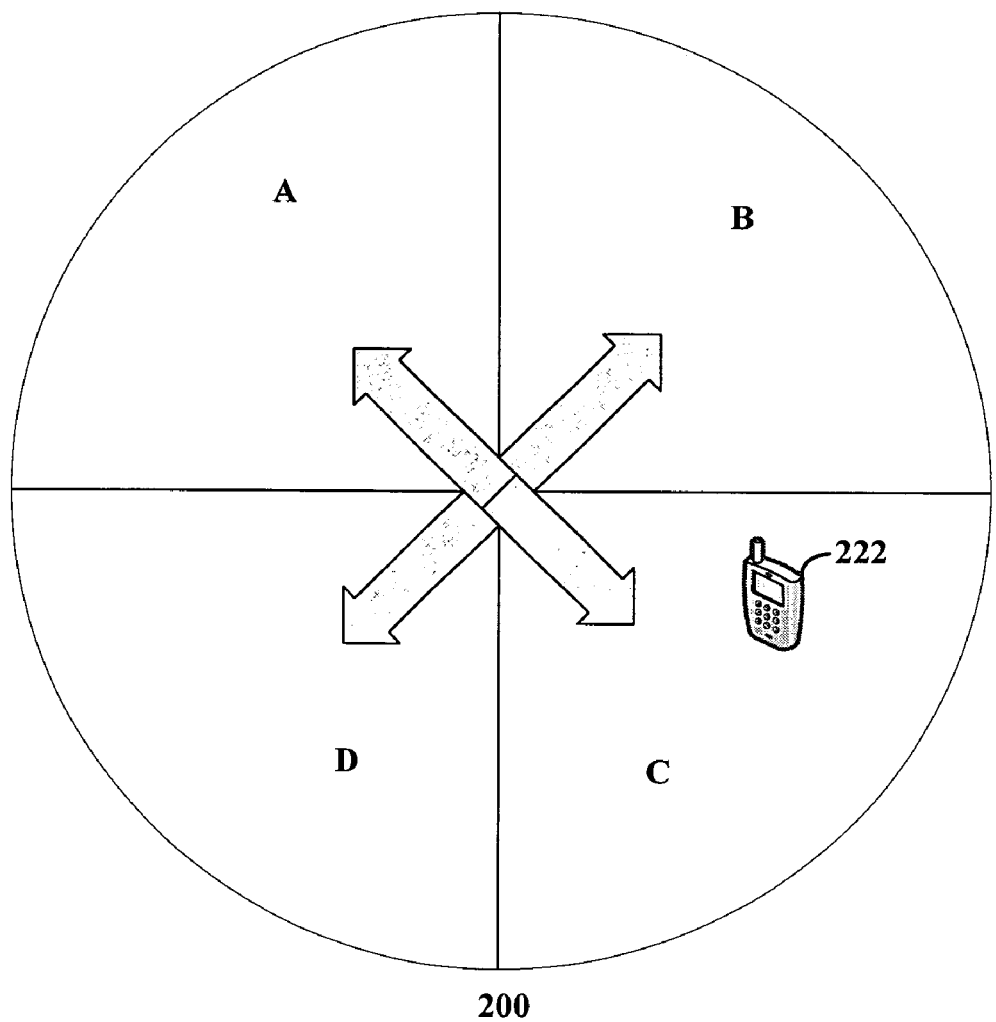
FIG. 2A shows sectorized transmission areas for a base station, according to an example embodiment of the present invention.

FIG. 2A shows sectorized transmission areas for a base station, according to an example embodiment of the present invention. Area 200 is shown as having 4 sectors, each corresponding to a different directional antenna, however, any number of different sectors (and directional antenna) can be implemented. As shown in FIG. 2A, mobile station 222 is located within sector C. In a simple system, with little to no interference due to external factors (e.g., geography, large structures or other interference) the signal from the directional antenna pointed in direction C would have the largest RSS. Moreover, the RSS from this directional antenna would vary relative to the location within sector C. RSS from sectors B and D would be weaker, while the RSS from sector A would be the weakest. Thus, by knowing the transmission angle of each sector and the relative strengths of each signal, the azimuth angle can be determined.

According to one embodiment of the present invention, the relative differences between the RSS and the expected signal strength for a particular azimuth angle are compared for each of the different sectorized antennas. Thus, factors other than the azimuth angle of the antennas and mobile device (e.g., fading/shadowing effects) can be factored into the calculations.

A specific embodiment of the present invention is directed to cellular technology and the IS-95 system and the like. The forward link in the IS-95 system is the wireless link from a base station to mobile stations in the cell. As defined in IS-95, a forward link consists of one pilot channel, one Synch channel, at least one Paging channel and a number of Traffic channels which can be distinguished by time orthogonal codes (64 Walsh codes) of length 64. Therefore, the maximum number of code channels in a forward link is 64 and a forward link occupies a forward link CDMA channel of which the bandwidth is 1.2288 MHz.

A pilot channel is an un-modulated spread spectrum channel that can be used for code phase (timing) acquisition, frequency synchronization and coherent traffic channel demodulation at a mobile station. In one instance, a pilot channel is a continuous channel spread by inphase (I-phase) and quadrature phase (Q-phase) pseudo-noise (PN) codes with a unique code offset, called PN offset, allocated to each base station. A pilot channel can also possess dominant transmission power among all forward link channels.

The Sync channel uses a known modulation scheme so that any mobile station acquiring a PN code phase can demodulate the messages in the Sync channel to obtain the system parameters. The number of paging channels could be 1 to 7 in a forward link and a paging channel usually conveys system overhead information and paging messages to mobile stations in the cell. Each traffic channel carries user information, voice and data, and signaling information to mobile stations in the traffic state.

In one instance, the input of a pilot channel is a continuous symbol stream of all digital 0s (or all +1 s in antipodal representation) that is modulated with a Walsh code and spread with I-phase and Q-phase PN codes of the base station.

The pilot channel can use a known Walsh code 0, which is a stream of all digital 0s (or all +1s in antipodal representation) in 1.2288 Mcps. A sync channel can use Walsh code 32, paging channels use Walsh codes 1 to 7, and each Traffic channel can use one of the Walsh codes 8 to 31 and 33 to 63. I-phase and Q-phase PN codes are a maximal length sequence of $2^{15}-1$ code length which is equal to 26.667 msec of period in time.

If the pilot channel uses Walsh code 0 to modulate all digital '0' data, the actual input to the PN spreading block is all digital '0' data in 1.2288 Mcps. Therefore, a pilot channel is simply comprised of I-phase and Q-phase PN code signals of the base station.

If $I_{or}$ is the total transmitted power spectral density of a forward link CDMA channel, then $$\frac{\text{Pilot}E_c}{I_{or}} + \frac{\text{Sync}E_c}{I_{or}} + \frac{\text{Paging}E_c}{I_{or}} + \qquad (3.1)$$
$$\frac{\text{Traffic}E_c}{I_{or}} + \frac{\text{PowerControl}E_c}{I_{or}} + \frac{\text{OCNSE}_c}{I_{or}} = 1$$

(in linear scale) where $E_c$=average transmit energy per PN chip $$\frac{\text{Pilot}E_c}{I_{or}} = -7 \text{ dB}$$

is the ratio of $E_c$ for the Pilot channel to $I_{or}$ $$\frac{\text{Sync}E_c}{I_{or}} = -16 \text{ dB}$$

is the ratio of $E_c$ for the Sync channel to $I_{or}$ $$\frac{\text{Paging}E_c}{I_{or}} = -12 \text{ dB}$$

is the ratio of $E_c$ for the Pilot channel to $I_{or}$ $$\frac{\text{Traffic}E_c}{I_{or}} = -16 \text{ dB}$$

is the ratio of $E_c$ for the forward Traffic channel to $I_{or}$ when 9600 bps traffic data rate is assumed $$\frac{\text{PowerControl}E_c}{I_{or}} = -26.41 \text{ dB}$$

is the ratio of $E_c$ for the power control sub channel to $I_{or}$.

$$\frac{\text{OCNS}E_c}{I_{or}} = -1.64 \text{ dB}$$

is the ratio of $E_c$ for the Orthogonal Channel Noise Simulator to $I_{or}$.

Equation (3.1) shows the relative transmit power allocations to code channels in a forward link. Since the pilot channel is used by all mobile stations for the PN acquisition, timing reference, handoff, etc., the largest power is allocated to the pilot channel for high system reliability.

The proportion of the pilot channel power to the total forward link power is denoted by β. Equation (3.1) shows that the sync channel uses about 2.5% of the total forward link power. Though it is only 2.5%, the energy per chip in the sync channel is high enough because the data rate is as low as 1200 bps. Paging channels and traffic channels in the forward link use 6.3% and 2.5% of the total forward link power, respectively. The energy per chip of the Power Control sub-channel uses 0.23% of forward link power when the forward link traffic channel has 9600 bps. The Power Control Bit is a part of the forward link traffic channel and uses 1/11 of the forward link traffic channel power because there are two symbols used for a Power Control Bit out of 24 traffic channel symbols in a traffic channel frame. The Orthogonal Channel Noise Simulator (OCNS) represents all other forward link traffic channels which are assumed to have 68.5% of forward link power.

Since a mobile station in CDMA based mobile communication system constantly shares time and frequency resources with others, the definition of pilot $E_c/I_{or}$ in (3.1) does not represent the ratio of the average transmit energy per PN chip for the pilot channel to the total received signal power.

Pilot $E_c/I_o$ is the ratio of the combined pilot channel energy per chip to the total received power spectral density, $I_o$, of at most k usable multipath components at a mobile station, where k is the number of demodulating elements supported by the mobile station. Therefore, pilot $E_c/I_o$ can be defined as $$\frac{\text{Pilot}E_c}{I_o} = \frac{\hat{I}_{or} \times \frac{\text{Pilot}E_c}{I_{or}}}{I_{oc} + \hat{I}_{or}} = \frac{\frac{\text{Pilot}E_c}{I_{or}}}{\frac{I_{oc}}{\hat{I}_{or}} + 1} \quad (3.2)$$

where $I_{or}$ is the transmit power spectral density of the forward link CDMA channel at the service base station, is the received power spectral density of the forward link CDMA channel at the mobile station, and $I_{oc}$ is the total received power spectral density of the forward link CDMA channel from all neighboring base stations. The path loss in the forward link of the service base station, L, is defined as $$L = I_{or} - \hat{I}_{or} (dB). \quad (3.3)$$

The pilot $E_c/I_t$ in the IS-95 CDMA system is more affected by interference from nearer base stations. Therefore, the pilot $E_c/I_t$ of a neighboring base station is severely reduced when the mobile station is close to the service base station.

A practical radiation pattern of an example sector antenna is consistent with $$G(\phi) = \begin{cases} 25.1 \times \left( \frac{\sin(0.0045771 \times \phi)}{0.045771 \times \phi} - 1 \right), & \phi \leq w \\ -\infty, & \text{Otherwise} \end{cases} \quad (6.1)$$

where Φ is the radiation angle and the typical effective radiation angle is 2w=120°.

Figure 3:
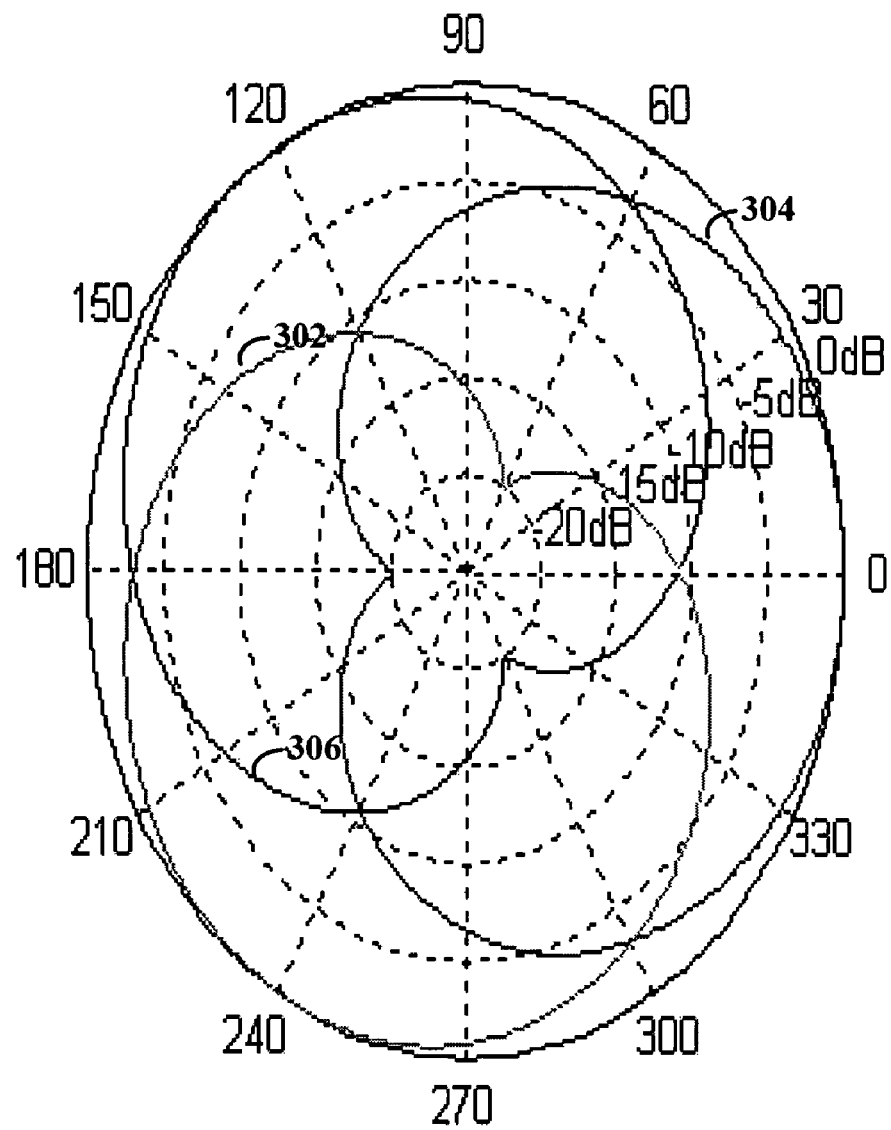
FIG. 3 shows exemplary radiation gain patterns for a base station having three sectors, according to an example embodiment of the present invention.

FIG. 3 shows a general example of radiation patterns of sector antennas of a 3-sectored cell, where antennas are directing $\theta_s = [0°, 120°, 240°]$ along the azimuth of the base station.

Using (6.1), the AOD estimation can be based on the principal equation:

$$\hat{\theta}_0 = \underset{\theta_0}{\text{argmin}} \sum_{i=1}^{3} \left| \left( \frac{E_c}{I_t} \right)_{i,\text{measured}} - \left( \frac{E_c}{I_t} \right)_{i,\text{estimated}} \right|^2 \quad (6.2)$$

$$\left( \frac{E_c}{I_t} \right)_{i,\text{estimated}} \cong \frac{\beta G_{ti}(\theta_0)}{d(0)^{\gamma 0} \sum_{j=0}^{18} d(j)^{-\gamma j} \sum_{s=1}^{3} G_{ts}(\theta_j)} \quad (6.3)$$

where, $\left( \frac{E_c}{I_t} \right)_{i,\text{estimated}}$ = estimated $E_c/I_t$ of $i$ th sector of the service base station $\left( \frac{E_c}{I_t} \right)_{i,\text{measured}}$ = measured $E_c/I_t$ of $i$ th sector of the service base station $G_{ti}(\theta)$=Tx. antenna gain of i th sector antenna at the azimuth angle θ d(j)=the distance between the mobile station and the j th base station $\gamma_j$=the path loss attenuation exponent for forward link of j th base station β=the ratio of pilot channel power to the total forward link power $I_t$=the total received average interference and noise power.

The principal equation in (6.2) requires an accurate $E_c/I_t$ estimation, of which the average value is defined as (6.3). Knowledge of d(j) and $\gamma_j$, for all j is required to estimate $E_c/I_t$ in (6.3), but it is difficult to estimate d(j) and $\gamma_j$, for all j.

Another way to estimate AOD without the knowledge of d(j) and $\gamma_j$, for all j, is to utilize the $E_c/I_t$ (dB) difference between neighboring sectors such as $$\hat{\theta}_0 = \underset{\theta_0}{\operatorname{argmin}} \sum_{(j,k) \subset S}^{S} \left| \left( \left[ \frac{E_c}{I_t} \right]_{j,measured} - \left[ \frac{E_c}{I_t} \right]_{k,measured} \right) - \left( \left[ \frac{E_c}{I_t} \right]_{j,estimated} - \left[ \frac{E_c}{I_t} \right]_{k,estimated} \right) \right| \quad (6.4)$$

where
(j,k)=a pair of neighboring sectors of service base station
S=a set of all (j,k) pairs, e.g., {(1,2), (1,3), (2,3)} for 3 sectors.

Since $I_t$ is the same for both of the neighboring sectors, the estimated $E_c/I_t$ difference between any two neighboring sectors is simply equal to the radiation gain difference at the azimuth of AOD($\theta_0$) between the sector antennas such as $$\left( \left[ \frac{E_c}{I_t} \right]_{j,estimated} - \left[ \frac{E_c}{I_t} \right]_{k,estimated} \right) = (G_{tj}(\theta_0) - G_{tk}(\theta_0)) \text{ in dB}. \quad (6.5)$$

Since the received forward link signals power from base stations independently vary with time, the measured $E_c/I_t$ (dB) varies continuously with its mean defined in (6.3). This is a source of error in AOD estimation; however, it can be effectively reduced by an averaging filter. Another source of error comes from the difference between the 2-dimensional generalized radiation pattern model in (6.1) and the 3-dimensional radiation pattern of the sector antenna used in practice. This may require specific antenna information.

There are two exceptional cases in applying (6.4). First, there are some test points where only one pilot channel is received with $E_c/I_t \geq 30$ dB. Second, there are some test points where only two pilot channels are received with $E_c/I_t$30 dB.

For the first problem, the AOD is assumed to be the same as the main direction of the sector antenna from which the received pilot channel was transmitted. The second problem causes two possible AOD values ($\hat{\theta}_0$, $\hat{\theta}_0+180°$). The wrong angle is discarded simply by using the fact that the mobile station is not located in the sector to which the un-received pilot channel belongs.

The mean of errors is obtained by averaging a number of estimated AOD errors at each point as $$\overline{\theta}_{AOD} = \frac{1}{N} \sum_{n=1}^{N} \theta_{n,AOD} \quad (6.6)$$

where
N=number of estimated errors
$\theta_{n,AOD}$=AOD estimation error at n th test
$\overline{\theta}_{AOD}$=mean of AOD estimation errors.
The standard deviation of AOD estimation errors defined by $$\sigma_{AOD} = \frac{1}{N} \sum_{n=1}^{N} \sqrt{(\theta_{n,AOD} - \overline{\theta}_{AOD})^2} \quad (6.7)$$

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, such changes may include the use of digital logic or multiple microprocessors to perform AOD calculations. Such modifications and changes do not depart from the true spirit and scope of the present invention, which is set forth in the following claims.

What is claimed is:

1. For azimuth angle estimation of the location of a mobile station with respect to a nearby base station covering a service area using common sectorization via multiple directional antennas respectively transmitting at different azimuth angles, a radio-signal processing apparatus comprising:
   a memory having information that associates directional sector antennas of the nearby base station and expected antenna radiation gains corresponding to azimuth directions relative to the nearby base station; and
   a processor arrangement that determines received signal strengths of respective signals received from different ones of the directional sector antennas of the nearby base station and that determines an azimuth angle of departure estimation by comparing the stored information, including at least some of the expected antenna radiation gains, with the received signal strengths,
       wherein the comparison is a function of respectively transmitted and received pilot channel energies communicated in different sectors and a function of an assessment of total sector powers received and transmitted.

2. The radio-signal processing apparatus of claim 1, wherein the service area uses common sectorization via multiple directional antennas, which transmit using common frequency channels.

3. The radio-signal processing apparatus of claim 1, wherein the received signal strengths are a function of a ratio of detected pilot channel energy to total received power spectral density.

4. The radio-signal processing apparatus of claim 3, wherein the processor arrangement determines an estimated location azimuth of the mobile station based upon comparing the difference between the ratio of a detected pilot channel energy of first sector to total received power spectral density and the ratio of detected pilot channel energy of second sector to total received power spectral density to the difference between the ratio of transmitted pilot channel energy of the first sector to total transmitted sector power spectral density and the ratio of transmitted pilot channel energy of the second sector to total received power spectral density.

5. The radio-signal processing apparatus of claim 1, wherein the received signals are pilot signals and the processor arrangement determines the received signal strengths using a portion of a pilot signal that is a predetermined symbol.

6. The radio-signal processing apparatus of claim 1, wherein the received signals are pilot signals and the processor arrangement determines the received signal strengths using an earliest arrival component of the pilot signals.

7. The radio-signal processing apparatus of claim 1, wherein the processor arrangement determines an estimated location azimuth using a moving average filter.

8. For azimuth angle estimation of the location of a mobile station with respect to a nearby base station covering a service area using common sectorization via multiple directional antennas respectively transmitting at different azimuth angles using a common frequency range, a radio-signal processing apparatus comprising:
   memory means for storing information that associates directional sector antennas of the nearby base station and expected antenna radiation gains in the common sectorization service area corresponding to azimuth angles relative to the nearby base station; and processor means for determining an azimuth angle of departure estimation by comparing the stored information with received signal strengths of signals received from the directional sector antennas of the nearby base station, based on respectively transmitted and received pilot channel energies communicated in different sectors and as a function of an assessment of total sector powers received and transmitted.

9. A method for determining an azimuth angle estimation for the location of a mobile station with respect to a nearby base station covering a service area using common sectorization via multiple directional antennas respectively transmitting at different azimuth angles, the method comprising:

receiving signals from the multiple directional antennas;

determining received signal strengths for respective ones of the multiple directional antennas;

comparing, based on respectively transmitted and received pilot channel energies communicated in different sectors and as a function of an assessment of total sector powers received and transmitted, the received signal strengths to information that associates directional sector antennas of the nearby base station and expected antenna radiation gains in azimuth directions of departure relative to the nearby base station; and providing the azimuth angle estimation based upon a result of the comparing step.

10. The method of claim 9, wherein the service area uses common sectorization via the multiple directional antennas, which transmit using common frequency channels.

11. The method of claim 9, wherein the determined received signal strength is a function of a ratio of detected pilot channel energy to total received power spectral density.

12. The method of claim 11, wherein the step of comparing is based upon comparing the difference between the ratio of a detected pilot channel energy of first sector to total received power spectral density and the ratio of detected pilot channel energy of second sector to total received power spectral density to the difference between the ratio of transmitted pilot channel energy of the first sector to total transmitted sector power spectral density and the ratio of transmitted pilot channel energy of the second sector to total received power spectral density.

13. The method of claim 9, wherein the received signals are pilot signals and the step of determining the received signal strengths using a portion of a pilot signal that is a predetermined symbol.

14. The method of claim 9, wherein the received signals are pilot signals and a processor arrangement determines the received signal strengths using an earliest arrival component of the pilot signals.

15. The method of claim 9, wherein the step of comparing uses a moving average filter.

\* \* \* \* \*